United States Patent [19]
Lu

[11] Patent Number: 5,873,654
[45] Date of Patent: Feb. 23, 1999

[54] TWIN SCREW EXTRUDER TYPE BATCH MIXERS

[76] Inventor: Yun Lu, 1041 Concord Cir., Mundelein, Ill. 60060

[21] Appl. No.: 744,633

[22] Filed: Nov. 6, 1996

Related U.S. Application Data

[60] Provisional application No. 60/006,280 Nov. 7, 1996.

[51] Int. Cl.$^6$ .............................. A21C 1/06; B01F 15/02; B01F 7/08

[52] U.S. Cl. .......................... 366/84; 366/156.2; 366/189; 366/300; 425/209

[58] Field of Search ................................ 366/83, 84, 100, 366/189, 194, 196, 156.2, 76.1, 76.2, 76.93, 77, 292, 297, 300, 134, 318; 425/208, 204

[56] References Cited

U.S. PATENT DOCUMENTS

| 3,602,484 | 8/1971 | Poncet | 366/84 |
| 3,749,374 | 7/1973 | Buchheit | 366/100 |
| 4,844,619 | 7/1989 | Lesar et al. | 366/300 |
| 5,083,506 | 1/1992 | Horn et al. | 366/297 |
| 5,228,775 | 7/1993 | Horn et al. | 366/300 |

*Primary Examiner*—Tony G. Soohoo

[57] ABSTRACT

A twin screw extruder type batch mixer that is comprised of two screws parallel to each other with the distance between the two screw center lines being larger or equal than the half of the sum of two screw diameters and the two screws conveying material in the opposite direction during mixing and reacting stage and the same direction during charging and discharging stages; and a barrel casing completely enclosing said screws which can run clockwise and counter-clockwise independently.

6 Claims, 5 Drawing Sheets

TWIN SCREW EXTRUDER TYPE BATCH MIXERS

This is a provisional application Ser. No. 60/006,280 filed Nov. 7, 1996.

TECHNICAL FIELD

This invention relates to batch mixers with twin screw configurations. The mixers are useful for melting, mixing and reacting highly viscous materials. Especially, they are useful for melting, mixing and reacting polymer materials.

BACKGROUND

The most widely used batch mixer for bulk polymer materials mixing is rotor type mixer called internal mixer which was originally designed by Banbury (Banbury, F. H., U.S. Pat. No. 1,200,070, 1916). Over the years since its inception, numerous modifications in design have been introduced, but the basic principle remains the same. They are all comprised of two parallel kneading rotors, each rotating within the corresponding region of a double trough or W-shaped chamber, but with the walls of the chamber continuing upwards over the rotors to constitute a closed mixing chamber. Although widely used in rubber and plastics compounding, these types of mixers have some shortcomings. One of them is material discharge. In these machines, at the completion of the mixing cycle, the discharge door is opened and the mass was discharged by gravity as shapeless lump or lumps which are difficult to handle for the next operation. This discharge mechanism makes it necessary to interpose at least one more intermediate processing stage before final shaping or next operation. It is also difficult for some materials to discharge and discharge completely. For small laboratory internal mixer machines as produced by C. W. Brabender Inc. and Haake Buchler Instruments Inc., there is no discharge door. The discharge has to be performed by disassembling the mixer and then removing the material manually. Very often, time spent on recovering the final material and cleaning the machine is more than testing time.

Another shortcoming with a internal mixer is in tts use in evaluating materials for an extrusion process. One of the major uses of a laboratory internal mixer is to test the processibility of thermoplastics, thermosets and elastomers, and transfer the information to a continuous production process such as extrusion. As both the geometry of a internal mixer and mixing mechanism are different from those of an extruder, it is often difficult to predict extrusion results from information learnt through a batch internal mixer study. Scott and Macosko (Scott, C. E. and Macosko, C. W., Polymer Engineering and Science, 33, 1065, 1993) developed a batch mixer named the recirculating screw mixer (RSM) based on single screw extrusion technology. The mixing mechanism in RSM is more representative of that in a continuous single screw extruder and thus results obtained are more meaningful in scale up for continuous single screw extrusion operation. However, a single screw extruder and RSM do not have very good mixing capabilities. More polymer mixing and reaction processes are performed in twin screw extruders which have much better mixing capabilities. Thus a twin screw type batch mixer should provide not only a good batch mixer but also a tool with which useful information which can be easily transformed to continuous twin screw extrusion can be learnt.

Thus, it is the objective of this invention:

(a) to provide a design of a batch mixer with a twin screw configuration;

(b) to provide a design of a batch mixer which has a efficient material discharge mechanism and the material can be formed into certain shape per discharge;

(c) to provide a design of a batch mixer which can be used to provide useful information for continuous twin screw extrusion processes.

DESCRIPTION OF THE DRAWINGS

FIG. 2a shows the screw rotational directions and material flow during the charging and discharging mode; FIG. 2b shows the screw rotational directions and material flow during the mixing mode.

DESCRIPTION OF INVENTION

Figure 1:
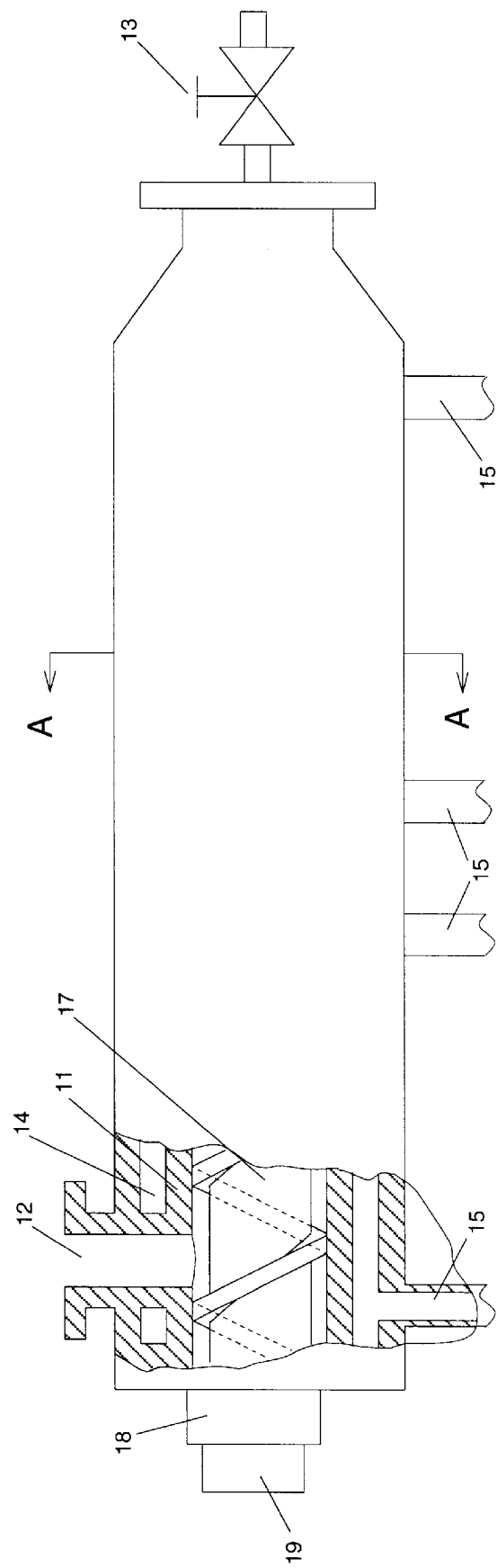
FIG. 1 is an elevation view of the same hand screw flight version of the batch mixer of the present invention.
Figure 2A:
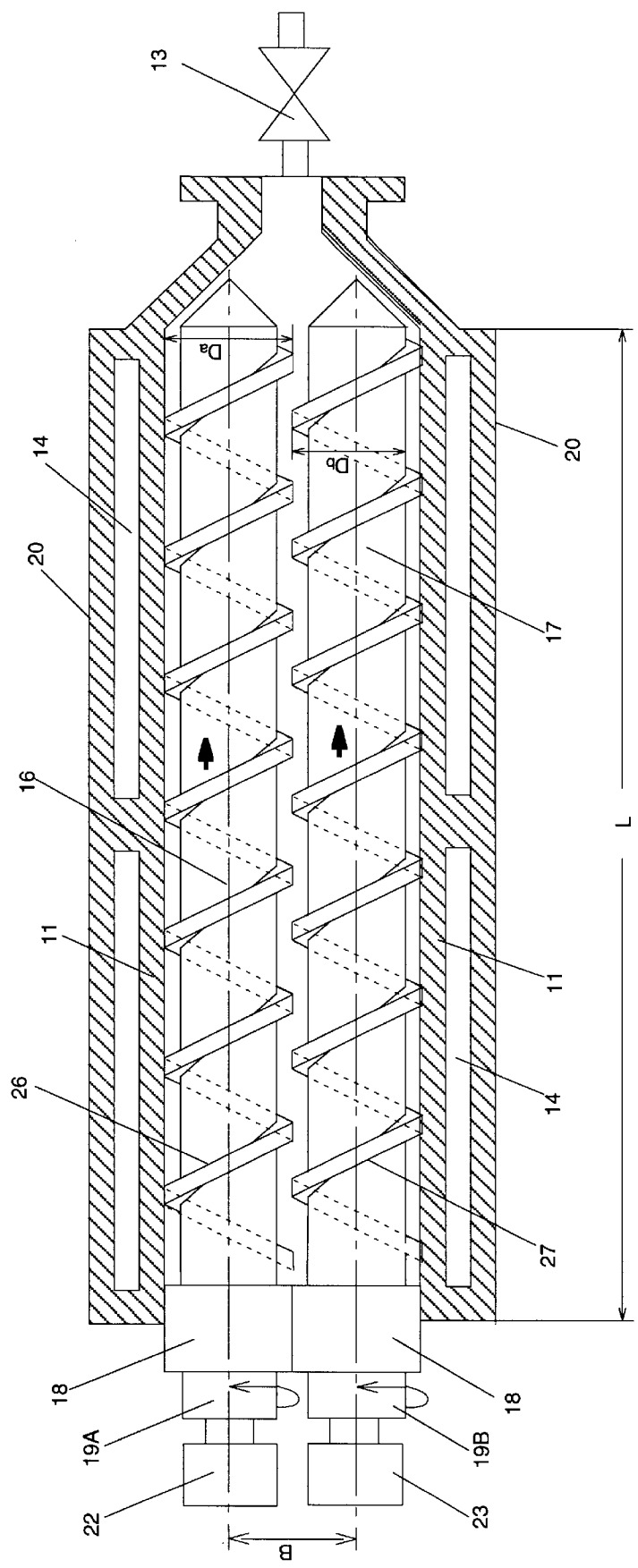
FIGS. 2a–2b are cross sectional plan views of FIG. 1.
Figure 2B:
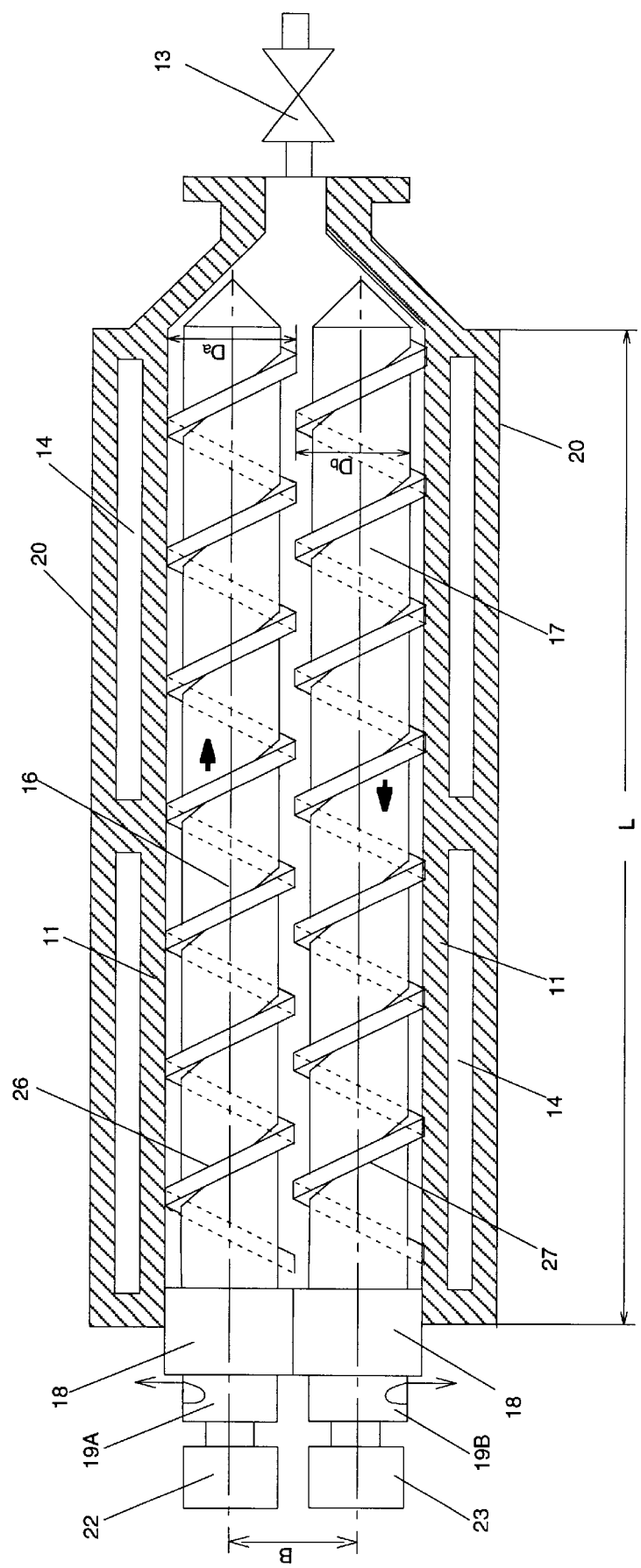
Figure 3:
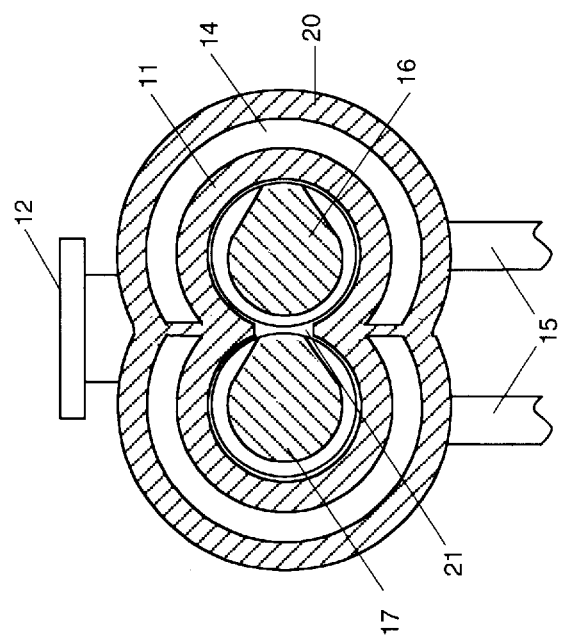
FIG. 3 is a cross sectional end view taken along line A—A of FIG. 1.

In the apparatus of FIGS. 1 TO 3, a barrel casing or housing 11 is made of a suitable material such as an alloy of steel. Housing 11 is shown in a FIG. 8 shape, but is not limited to such a shape. Housing 11 also need not be limited to one piece as shown in FIGS. 1 to 3. It may consist of different sections of different lengths or same length. Each section may be formed of two halves(as known as split barrel design). Housing 11 contains a feed inlet 12 and a product outlet with a closing device 13, as well as a jacket chamber 14 having an outer shell 20 for use with an appropriate heat transfer fluid. Heat transfer fluid inlet and outlet conduits 15 communicate with jacket chamber 14 which may also contain other typical auxiliaries such as thermocouples, pressure gauges, sampling ports, etc. which are not shown. Screws 16 and 17 runs in two modes: co-rotating and counter-rotating. Co-rotating mode is normally used just for loading or unloading materials while counter-rotating mode is normally used for testing, mixing, reacting materials. Screw shaft ends 19a and 19b extend through shaft seals 18a and 18b are coupled to reversible motors 22 and 23. A torque measurement attachment which measures the torque on the screws is used but not shown in the figures. The helix angles and the channel depths of both screws need not be same. The rotational speeds of the screws also need not be same. The Screw flights 26 and 27 of screw 16 and 17 can be either right handed or left handed, but must be of the same hand. The diameters of screw 16 and screw 17 are indicated as $D_a$ and $D_b$ and the mixer length is indicated as L. The distance between the two screw center lines 24 and 25 is shown as B. The pitches of the screws may independently ranges from $\frac{1}{5}$ to 8 of screw diameter as is well known in the art of extrusion. The mixer length to half of the sum of two screw diameters should be in the range of 1 to 40.

Figure 4:
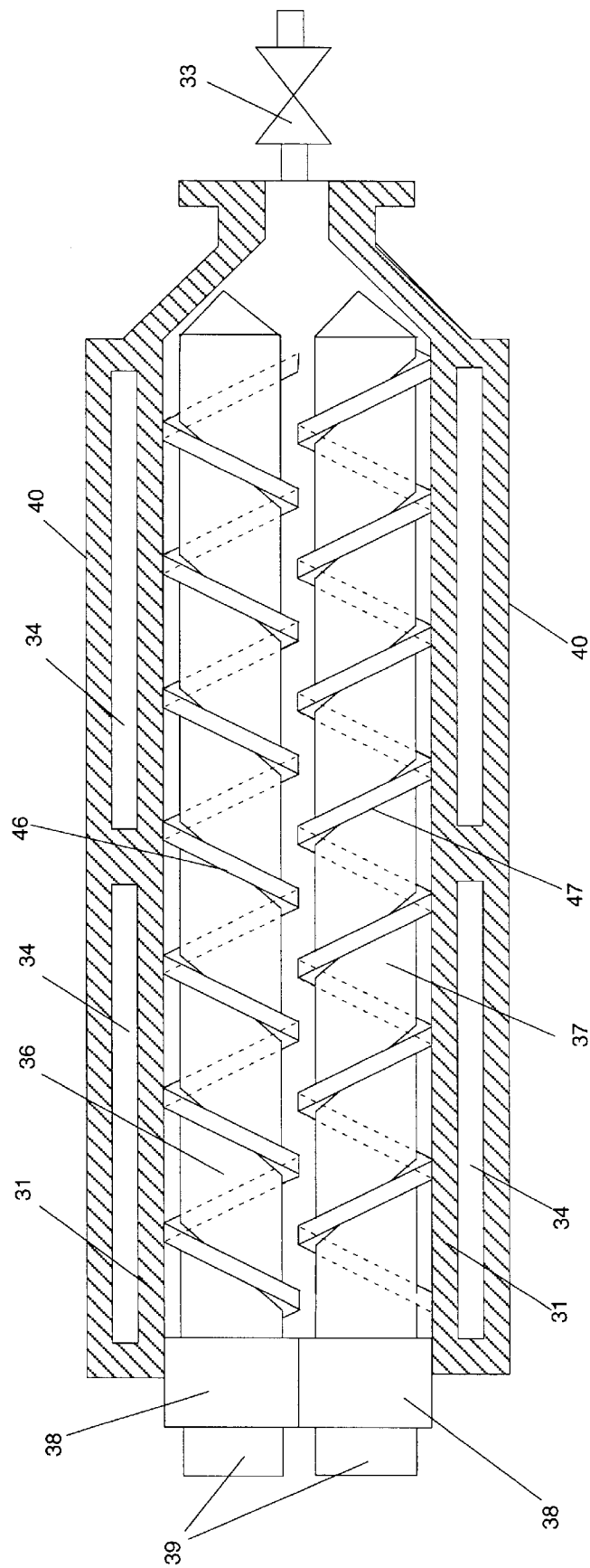
FIG. 4 is a cross sectional plan view of an opposite hand screw flight version of the mixer of the present invention.

The apparatus shown in FIG. 4 is analogous to that shown in FIGS. 1–3, except that the two screw flights are of opposite hands. Another exception is that for opposite hand screw flight case, there are two configurations: Staggered or matched screw flight oppositions. In the opposite hand screw flight apparatus, counter-rotating mode is normally for loading and unloading materials while the co-rotating mode is normally for testing, mixing and reacting materials.

From the description above, a number of advantages of the twin screw type batch mixer become evident:

(a) During the charging and discharging stages, both of the screws drag material toward the discharge, which makes the process very easy.

(b) The discharge can be connected to a die and thus the material can be discharged into a certain form such as strands and then be cut into granules.

(c) As the material in this type of mixer experiences similar history as in a twin screw extruder, the information learnt from the batch mixer can be readily transfered to a continuous twin screw extrusion process.

Although several specific configurations of the mixers of the present invention have been shown for illustrative purposes, it should be understood that modifications well known in the art pertaining to extruders and batch mixers may be made to the present invention without departing from the spirit thereof. For example, the apparatus may be equipped with ports for liquid or solid additives, devolatilization, pressure release, sampling, viewing, etc. In addition, the mixers may be equipped with temperature and/or pressure gauges, thermocouples, inert gas blanket lines, dies at the discharge zone, etc. The scope of the invention should be determined not by the embodiments illustrated, but by the appended claims which follow.

What is claimed is:

1. A twin screw extruder type batch mixer comprised of:

(a) two screws parallel to each other and non-intermeshing;

(b) a barrel casing completely enclosing said screws and containing a feed inlet and a product outlet with a closing device on each, said screws having same hands throughout the entire mixer barrel casing.

(c) means for charging materials to the mixer by running the two screws in the same direction either clockwise or counter-clockwise so that the material flows from the inlet to the outlet direction;

(d) means for melting and mixing the material by running the two screws in the opposite directions so that one screw move the material from the inlet to the outlet direction while the other screw moves the material from outlet to the inlet direction;

(e) means for discharging the mixed material by running the two screws in the same direction either clockwise or counter-clockwise so that the material flows from the inlet to the outlet direction;

(f) means for forming the discharging material into certain shapes connected to said mixer outlet.

2. The mixer of claim 1 wherein the screws independently have pitches in the range of $1/5$ to 8 of screw diameter.

3. The mixer of claim 1 wherein the mixer length to half of the sum of two screw diameters ratio is in the range of 1 to 40.

4. A twin screw extruder type batch mixer comprised of:

(a) two screws parallel to each other and non-intermeshing;

(b) a barrel casing completely enclosing said screws and containing a feed inlet and a product outlet with a closing device on each, said screws having opposite hands throughout the entire mixer barrel casing.

(c) means for charging materials to the mixer by running the two screws in the opposite directions either clockwise or counter-clockwise so that the material flows from the inlet to the outlet direction;

(d) means for melting and mixing the material by running the two screws in the same direction so that one screw move the material from the inlet to the outlet direction while the other screw moves the material from outlet to the inlet direction;

(e) means for discharging the mixed material by running the two screws in the opposite direction either clockwise or counter-clockwise so that the material flows from the inlet to the outlet direction;

(f) means for forming the discharging material into certain shapes connected to said mixer outlet.

5. The mixer of claim 4 wherein the screws independently have pitches in the range of $1/5$ to 8 of screw diameter.

6. The mixer of claim 5 wherein the mixer length to half of the sum of two screw diameters ratio is in the range of 1 to 40.

* * * * *